United States Patent [19]

Bloom et al.

[11] 4,218,689

[45] Aug. 19, 1980

[54] ABLATABLE MEDIUM FOR OPTICAL RECORDING

[75] Inventors: Allen Bloom, East Windsor; Robert A. Bartolini, Trenton, both of N.J.

[73] Assignee: RCA Corporation, New York, N.Y.

[21] Appl. No.: 873,612

[22] Filed: Jan. 30, 1978

[51] Int. Cl.² .................................................. G01D 15/34
[52] U.S. Cl. .................................. 346/135.1; 8/467; 346/76 L; 430/945
[58] Field of Search ................. 346/135, 76 L, 135.1; 8/2.5 R, 2.5 A; 427/53; 96/27 R; 260/331; 430/945

[56] References Cited

U.S. PATENT DOCUMENTS

| | | | |
|---|---|---|---|
| 2,403,226 | 7/1946 | Lecher | 260/331 X |
| 2,475,821 | 7/1949 | Cullinan | 260/331 |
| 3,715,212 | 2/1973 | Ross | 96/48 |
| 3,978,247 | 8/1976 | Braudy | 346/76 L X |
| 4,023,185 | 5/1977 | Bloom | 346/135 |
| 4,032,691 | 6/1977 | Kido | 346/76 L X |
| 4,069,487 | 1/1978 | Kasai | 346/76 L |
| 4,097,895 | 6/1978 | Spong | 346/135 X |
| 4,101,907 | 7/1978 | Bell | 346/135 |

FOREIGN PATENT DOCUMENTS 1076799 7/1967 United Kingdom .

OTHER PUBLICATIONS

Bartolini et al; Review and Analysis of Optical Recording Media; Optical Engineering, vol. 15, No. 2, Mar.–Apr. 1976, pp. 99–108.

*Primary Examiner*—Joseph W. Hartary
*Attorney, Agent, or Firm*—Birgit E. Morris; Allen Bloom

[57] ABSTRACT

An ablative recording medium comprises a substrate coated with a light reflecting layer which in turn is coated with a light absorptive layer of 6,6'-diethoxythioindigo. During recording, portions of the light absorptive layer are ablated by a modulated focussed light beam, thereby exposing portions of the reflecting layer. Video information is recorded as a reflective-antireflective pattern.

5 Claims, 3 Drawing Figures

ABLATABLE MEDIUM FOR OPTICAL RECORDING

The Government has rights to this invention pursuant to Contract No. MDA904-76-C-0429 issued by the Department of the Army.

This invention relates to a novel optical recording medium. More particularly this invention relates to an optical recording medium for ablative recording.

BACKGROUND OF THE INVENTION

Spong, in a U.S. Application, Ser. No. 668,495 entitled, "Information Record and Related Recording and Playback Apparatus and Methods", now U.S. Pat. No. 4,097,895, issued June 27, 1978, has described an ablative recording medium which comprises a light reflective material, such as aluminum, which is coated with a thin film of an optically absorbing organic material, such as fluorescein. A focussed intensity modulated light beam, such as a laser beam from an argon or helium-cadmium laser, when directed at the recording medium, vaporizes or ablates the light absorbing material, leaving a hole or pit and exposing the reflective material. The thickness of the light absorbing layer is chosen so that the structure has minimum reflectivity. After recording there will be maximum contrast between the minimum reflectivity of the light absorbing layer and the higher reflectivity of the exposed metal material. Further, when the light reflective material is itself a thin layer on a nonconductive substrate, since little energy is lost through reflection from the thin absorbing layer, and little energy is lost by transmission through the reflecting layer, the energy absorption of the light beam is concentrated into a very thin film and recording sensitivity is surprisingly high.

U.S. Pat. No. 4,023,185 discloses that 4-phenylazo-1-naphthylamine provides an excellent light absorbing layer within the Spong structure which is absorptive at argon laser frequencies, and has improved toughness and abrasion resistance. This dye is applied by evaporation of Sudan Black B, which is thermally decomposed to form the naphthylamine layer.

Bloom et al, in a U.S. Application, Ser. No. 834,271, filed Sept. 19, 1977, entitled "Ablative Optical Recording Medium", have described a recording medium prepared by evaporating a light absorptive layer of di-indeno[1,2,3-cd:1', 2', 3'-lm]perylene over a light reflecting layer to form an antireflective layer at the recording wavelength. As taught in the copending Spong application, during recording, portions of the light absorptive layer are ablated by a modulated focussed light beam, thereby exposing portions of the reflecting layer. Thus, information is recorded as a reflective-antireflective pattern.

The above organic dye layers are somewhat soft and fragile and thus the dyes are desirably protected from dust and other airborne contaminants. Copending U.S. application of Bloom et al, "Thick Protective Overcoat Layer for Optical Video Disc", Ser. No. 828,815 filed Aug. 29, 1977, discloses applying a thick protective overcoat, such as a silicone resin, over the light absorptive layer. The information pattern is recorded through the protective overcoat which is comparatively undisturbed after recording. Only a few materials suitable for overcoat layers have been found because of the solubility of the above dyes in many organic polymer precursors. It would be desirable to find different dyes having good absorption at argon laser wavelengths.

SUMMARY OF THE INVENTION

We have found that 6,6'-diethoxythioindigo can be readily evaporated onto a light reflecting layer to form an excellent ablative recording medium for use with an argon laser.

DETAILED DESCRIPTION OF THE INVENTION 6,6'-Diethoxythioindigo has the formula

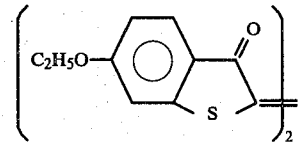

This dye is easily prepared, relatively inexpensive, and can be evaporated under vacuum directly onto light reflecting surfaces such as aluminum to form stable, insoluble layers. The present recording medium absorbs at the 4880 angstrom wavelength emitted by an argon laser. The index of refraction, n, is 1.59 and the absorption coefficient of the evaporated film, K, is 0.22. In accordance with the requirements described in the Spong application referred to above, a thickness of about 710 angstroms for 4880 angstrom wavelength recording is desirable to give a minimum reflection condition for this dye when evaporated onto a layer about 300 angstroms thick of aluminum which has been oxidized to a depth of 25–30 angstroms.

When the light reflecting layer is a thin layer on a substrate, the nature of the substrate is not critical but it must have an optically smooth, flat surface to which a subsequently applied light reflecting layer is adherent. A glass plate or disc is suitable as is an optically smooth polymer. If the light reflecting material can be formed so that it is self-sustaining and optically smooth, a substrate may be omitted.

The light reflecting material should reflect the light used for recording. Suitable light reflecting materials include aluminum, gold, rhodium and the like. Preferably the reflecting material is aluminum coated with a thin layer of aluminum oxide ($Al_2O_3$) which forms a highly reflective, inert and stable reflecting material. This reflecting material and its preparation are more fully described in copending U.S. application of Bartolini et al, Ser. No. 668,504, filed Mar. 19, 1976.

The present organic dye layer can be applied by placing an evaporating boat containing the dye in a vacuum chamber. The boat is connected to a source of current. The substrate coated with suitable light reflecting layer is positioned above the boat. The vacuum chamber is evacuated to about $10^{-6}$ torr and about 4 amperes are applied to the boat to raise its temperature to about 200° C., at which temperature the dye begins to evaporate. Evaporation is continued until a layer of the desired thickness is obtained, at which time the current is shut off and the chamber vented. The invention will be further explained by reference to the drawings.

Figures 1, 2:
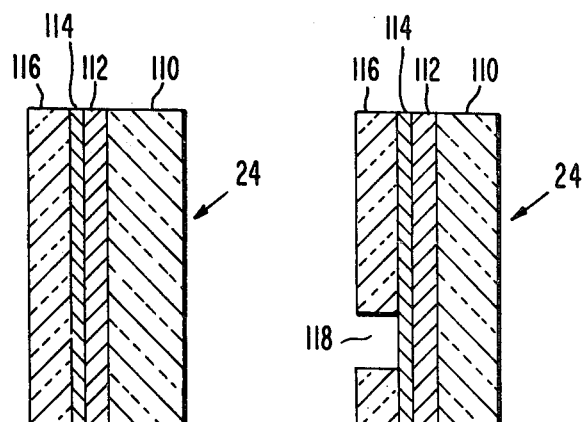
FIG. 1 is a cross sectional view of an unablated recording medium of the invention.
FIG. 2 is a cross sectional view of a recording medium of the invention after ablation.

FIG. 1 shows the recording medium 24 prior to exposure to a recording light beam comprising a glass substrate 110, a light reflecting layer 112 which can be a layer of aluminum about 300 angstroms thick and oxidized to a depth of about 30 angstroms to form an oxide layer 114 and a light absorbing dye layer 116 of 6,6'-diethoxythioindigo.

FIG. 2 shows a recording medium 24 of the invention after exposure to a recording light beam wherein the dye layer 116 has been ablated to leave a hole 118, exposing the oxide layer 114. It will be understood that a recording medium after recording contains a plurality of holes 118 rather than the single one shown in FIG. 2.

Figure 3:
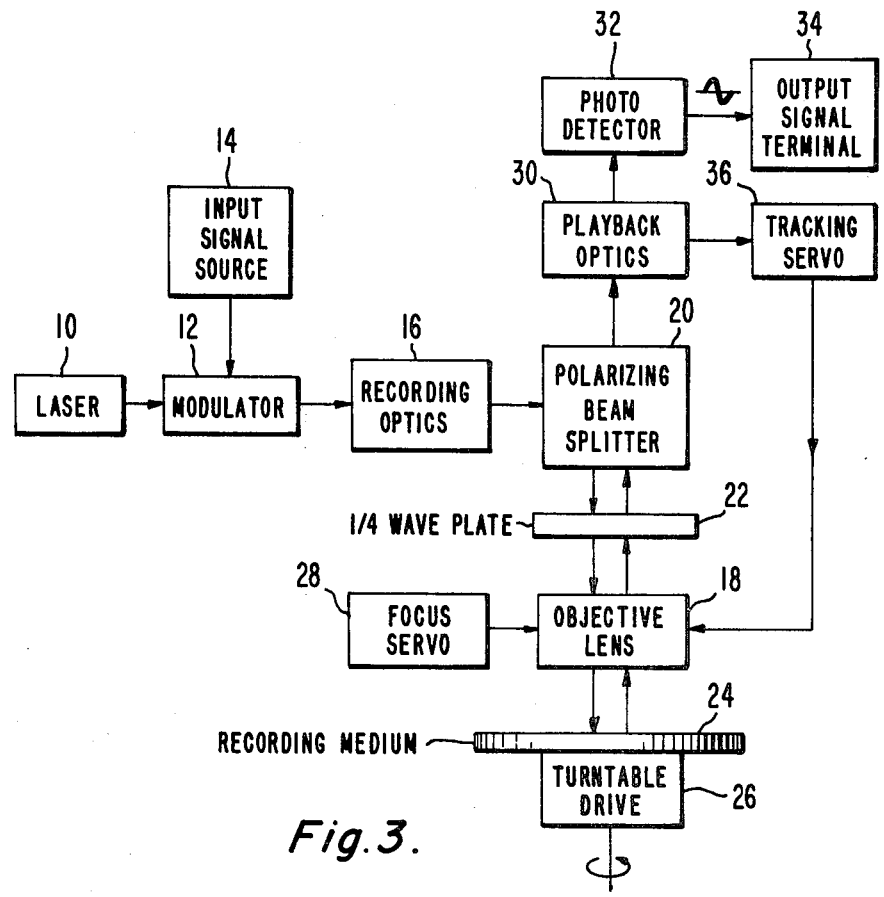
FIG. 3 is a schematic view of a system of recording and playback in which the present recording medium can be employed.

The use of the present recording medium can be explained in greater detail by referring to FIG. 3. For recording, the light emitted by a laser 10 is fed to a modulator 12 which modulates the light in response to an input electrical signal source 14. The intensity modulated laser beam is enlarged by recording optics 16 to increase the diameter of the intensity modulated laser beam so that it will fill the desired aperture of an objective lens 18. The enlarged modulated laser beam is totally reflected by a polarizing beam splitter 20 and passes through a beam rotating ¼ wave plate 22 to the objective lens 18. The modulated recording beam then impinges upon a recording medium 24, as described in FIG. 1, and ablates, or evaporates, a portion of the light absorbing layer to expose a portion of the reflecting layer. The recording medium 24 is rotated by the turntable drive 26 at about 1800 rpm in a spiral track. A focus servo 28 maintains a constant distance between the objective lens 18 and the surface of the recording medium 24.

For readout, an unmodulated and less intense laser beam, that is, one that will not cause ablation in the recording medium, follows the same path as the recording beam to the recording medium 24. The recorded reflection-antireflection pattern modulates the reflected light back through the objective lens 18 and the ¼ wave plate 22. The light, now rotated by 90° in polarization by the two passages through the ¼ wave plate 22, passes through the polarizing beam splitter 20 and is directed by playback optics 30 to a photodetector 32. The photodetector 32 converts the reflected light beam to an electrical output signal at terminal 34 which corresponds to the input signal. A tracking servo 36 monitors the light through the playback optics 30 to ensure that the track in the recording medium 24 during playback is the same as that used for recording.

The invention will be further illustrated by the following Examples but the invention is not meant to be limited to the details described therein.

EXAMPLE 1

A glass disc 12 inches (30.5 cm) in diameter was coated with a layer of aluminum about 300 angstroms thick. The surface was oxidized to a depth of about 30 angstroms to stabilize the metal layer.

The coated disc was rotated in a vacuum chamber above an evaporating boat containing 6,6'-diethoxythioindigo. A source of current was connected to the boat and the vacuum chamber was evacuated to about $10^{-6}$ torr. The boat was heated with the shutter closed by passing a current to the boat until the temperature reached about 200° C., when the shutter was opened. The dye began to evaporate at a rate of about 50 angstroms per minute. Evaporation was continued until the dye layer was about 710 angstroms thick.

A smooth, amorphous, clear and continuous absorptive layer was deposited onto the light reflecting layer.

The recording medium as prepared above was exposed to a recording signal of 50 nanosecond pulses of light having a wavelength of 4880 angstroms from an argon laser in an apparatus as in FIG. 3, varying the laser power. On readout the contrast between the light reflecting and the light absorbing layers was noted and the signal-to-noise ratio (SNR) in decibels (dB) measured for varying laser recording powers. The results are summarized in Table I below:

TABLE I

| Laser Power, mW | Contrast, % | SNR, dB |
|---|---|---|
| 600 | 49 | 40 |
| 400 | 46 | 40 |
| 300 | 40 | 42 |
| 200 | 40 | 40 |
| 100 | 22 | 32 |
| 60 | —threshold— | |

EXAMPLE 2

A second sample was prepared as in Example 1 and a signal was recorded thereon. A maximum SNR of 46 dB, with a contrast of 40%, was recorded at a laser output power of 300 mW.

EXAMPLE 3

To the recording medium prepared in Example 1, a silicone rubber protective overcoat layer (General Electric RTV-615) about 3 mils thick was applied according to the procedure in the copending U.S. application of Bloom et al, Ser. No. 828,815 referred to hereinabove and incorporated herein by reference.

A signal recording was made as in Example 1 having a maximum SNR of 30 dB and a contrast of 30% using an argon laser with an output power of 400 mW.

COMPARATIVE EXAMPLES

Recording media were prepared as in Example 1 except substituting as the light abosrbing layer an evaporated layer of (1) 6,6'-diisopropoxy thioindigo and (2) 6,6'-di-n-hexoxythioindigo, which have the general formula

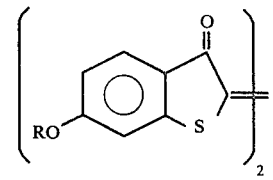

where R is an isopropyl or an n-hexyl group, respectively.

The resulting dye films were cloudy and thus unsuitable for the present application.

We claim:

1. In an ablative optical recording medium which comprises a light reflecting material coated with a light absorbing ablative layer which upon exposure to light ablates to expose the light reflecting material, the improvement which comprises employing as the light absorbing ablative layer a smooth, clear continuous, amorphous layer consisting of 6,6'-diethoxythioindigo.

2. A medium according to claim 1 wherein said reflecting material is aluminum.

3. A medium according to claim 1 wherein said light reflecting material is in the form of a thin layer on a substrate.

4. A medium according to claim 2 wherein said 6,6'-diethoxythioindigo layer is about 710 angstroms thick.

5. A medium according to claim 1 wherein a silicone resin protective overcoat layer is applied over the light absorbing layer.

* * * * *